July 17, 1934.   G. B. POLLOCK   1,966,684
FILM GUIDE AND REGISTRATION SYSTEM FOR MOTION PICTURE MACHINES
Filed Dec. 15, 1931   2 Sheets-Sheet 1
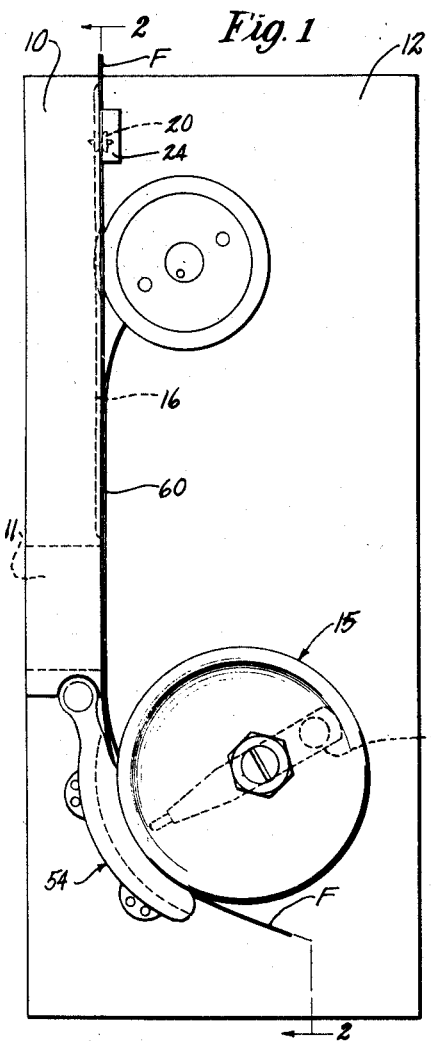
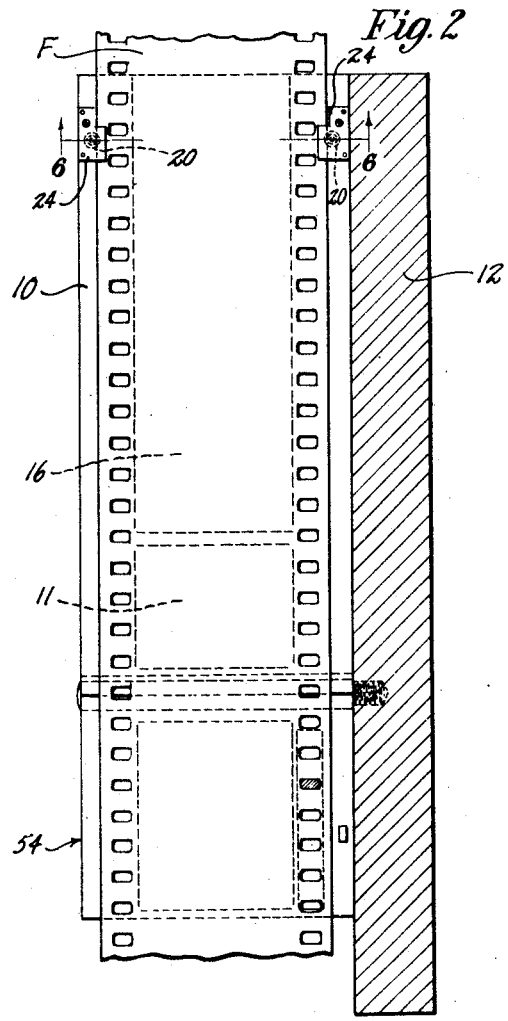
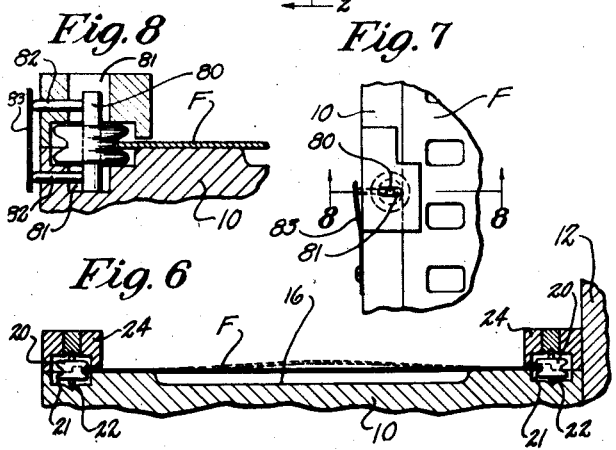
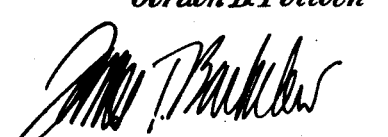
Inventor
Gordon B. Pollock
Attorney.

July 17, 1934.    G. B. POLLOCK    1,966,684
FILM GUIDE AND REGISTRATION SYSTEM FOR MOTION PICTURE MACHINES
Filed Dec. 15, 1931    2 Sheets-Sheet 2
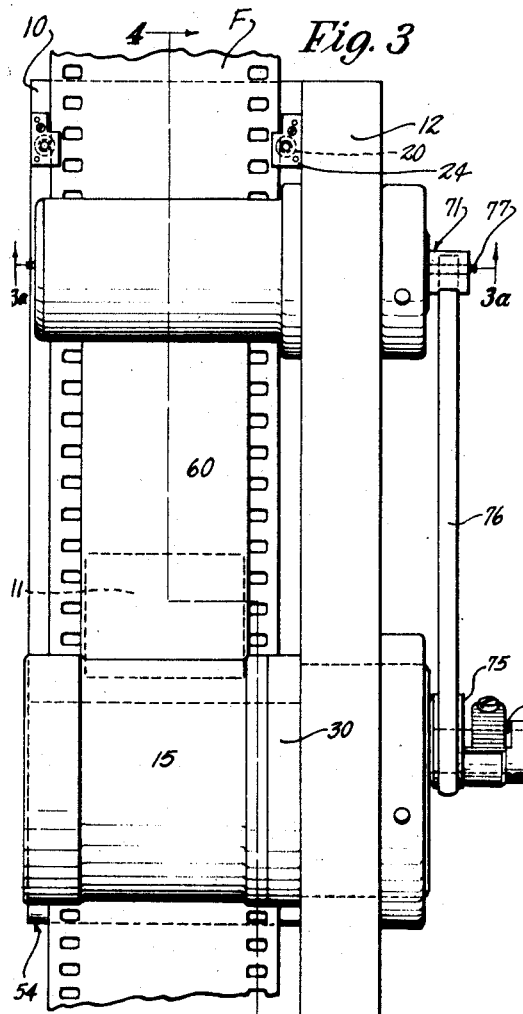
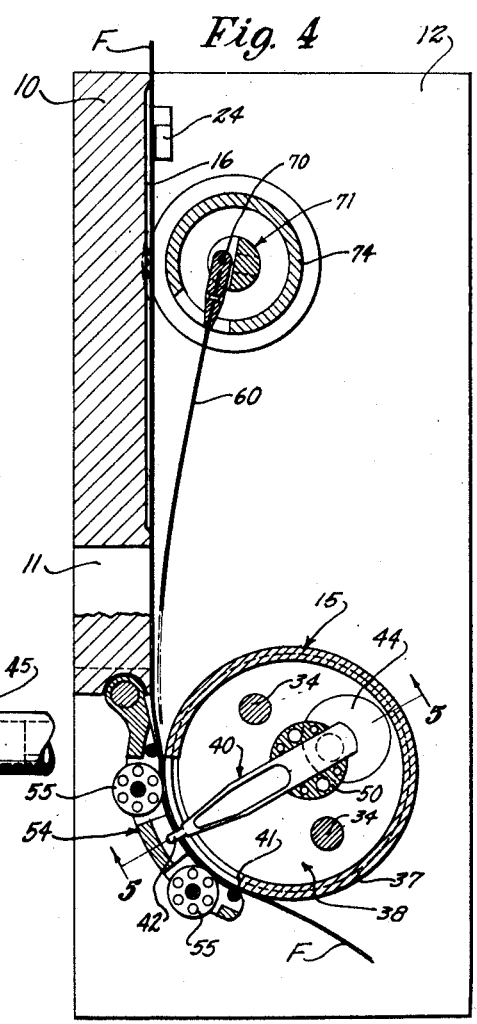
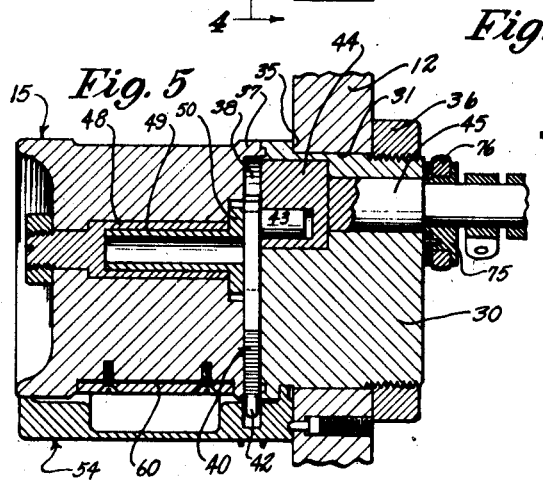
Inventor
Gordon B. Pollock.
Attorney.

Patented July 17, 1934

1,966,684

UNITED STATES PATENT OFFICE 1,966,684

FILM GUIDE AND REGISTRATION SYSTEM FOR MOTION PICTURE MACHINES

Gordon B. Pollock, Los Angeles, Calif.

Application December 15, 1931, Serial No. 581,158

6 Claims. (Cl. 88—18.4)

This invention has to do generally with improvements in film moving, guiding and registering means for motion picture machines, such as cameras, printers, projectors, etc. The invention is particularly applicable to the guiding and registering of film through the intermittent film movement mechanism of motion picture machines in general, and particularly of motion picture cameras, and the invention is therefore described with the last aspect primarily in view, but without limitation thereto.

The intermittent film movement mechanism of motion picture cameras commonly involves a film race and a claw member adapted intermittently to engage the film in said race and to move the film through successive frame lengths, and a register pin member adapted to engage the perforations of the film alternately with the claw pin in a manner designed to hold the film registered at the exposure aperture between periods of movement by the claw member. Usually the claw member and register member each involve full fitting perforation engaging pins at each edge of the film.

Such a system depends very greatly upon perfect uniformity in the spacing of the film perforations, both laterally and longitudinally of the film, if both the register and pull down pins are to engage perfectly with the perforations, and not strike the perforation edges. It is found in practice, however, that the perfection of uniformity required does not exist, longitudinal shrinkage of the film varying the longitudinal spacing of the perforations, and weaving of the film, among other factors varying the position of the perforations laterally. Such variations are of course exceedingly small, but nevertheless cause considerable trouble when both the register and pull down pins are carefully shaped to fit accurately on all sides in the perforations, as is required when the film is to be most accurately registered.

In accordance with the preferred form of the present invention, the film is guided at a point ahead of the film movement mechanism between a pair of guide rollers, and the movement mechanism has a single full fitting claw pin, at one edge of the film only, which fits the film perforations nicely. The preferred film holding mechanism utilized involves a pressure plate rather than a register pin, and is preferably of a spring plate type described and claimed in my copending application entitled Pressure plate for film movement mechanism, filed Dec. 15, 1931, Ser. No. 581,156. With this arrangement the film is capable of pivoting or swinging between the guide rollers, and the engagement of the claw pin with the film perforation may swing the film slightly between the rollers to determine its direction. The film is thus engaged at three points, i. e., at its two edges by two opposed guides, and at a point spaced longitudinally of the film therefrom by a registering claw pin; but the engagement by the claw pin determines the direction and registration of the film, and results in a constant, accurate relation being maintained between the perforations and film margins and the exposure aperture. Between periods of movement, the pressure plate acts to hold the film to the exact position in which it is left by the claw pin.

The invention itself, as well as its various objects and accomplishments, will be more fully understood from the following detailed description of a present preferred embodiment thereof, reference for this purpose being had to the accompanying drawings, in which:

Fig. 1 is a side elevation of a film movement mechanism embodying my improvements;

Fig. 2 is a section taken on line 2—2 of Fig. 1;

Fig. 3 is an elevation of the movement looking from the right in Fig. 1;

Fig. 3a is a detail section taken on line 3a—3a of Fig. 3;

Fig. 4 is a section taken on the broken line 4—4 of Fig. 3;

Fig. 5 is a section taken on line 5—5 of Fig. 4;

Fig. 6 is a section taken on line 6—6 of Fig. 2;

Fig. 7 is an enlarged detail of a variational film guide; and

Fig. 8 is a section taken on line 8—8 of Fig. 7.

In the drawings the numeral 10 designates generally the vertical aperture plate having an exposure aperture 11, and having extending at right angles from its rear edge a vertical wall 12. The film F is guided downwardly adjacent the rear face of plate 10 past the exposure aperture 11 to the intermittent film movement mechanism encased within cylinder 15, as more fully described hereinafter. Above aperture 11 the face of plate 10 is preferably recessed as at 16 to clear the emulsion area on the film (see Fig. 6).

At the upper end of aperture plate 10 the film passes between a pair of opposed marginal film guides in the form of rollers 20 mounted in recesses 21 in plate 10, so as to engage the edges of the film, as clearly shown in Fig. 6. Each roller is mounted on a center pointed pin 22, the lower point of which seats in a center spot in recess 21, and the upper point of which seats in a center spot in a supporting member 24 secured to plate 10. Now, as is well known, although motion picture film is originally made to a standard width, its width may change somewhat due to various causes. The rollers are therefore preferably spaced so as just to engage the two edges of the narrowest or most shrunk film apt to be encountered in practice, so that film of standard width is bowed a slight amount by the rollers (see Fig. 6), thus insuring that the film will be prevented from play between the rollers under all circumstances. The film is, however, capable of limited pivoting or swinging action between the rollers, and this swinging is controlled by the registering action of the film movement pin, as will be more fully described hereinafter. It is here to be noted that while freely rotatable rollers are preferred as the film guides, fixed guide pins may be substituted, if desired, and any such variation involving substantially point supports between which the film may swing, is contemplated within the broad scope of the invention.

From the lower end of aperture plate 10 the film passes down and around a guide surface formed on the periphery of cylinder 15. Cylinder 15 is mounted concentrically on a cylindrical carrier block 30 of the same diameter, which in turn is mounted in a round opening 31 in wall 12. Cylinder 15 is secured to block 30 as by screws 34. Block 30 has a shoulder 35 that comes against the front surface of wall 12, and its rear end is screw-threaded to take a nut 36 which is set up tightly to hold the block in proper position.

The inner end of cylinder 15 is formed with an annular flange 37 which defines an enclosed compartment 38 for the operation of claw arm 40. Flange 37 is cut away at 41 to permit the forward end of the claw arm to reach the film, and the forward end of the arm is provided with a film engaging claw pin 42 of proper size to fit nicely in the film perforations. The rear end of claw arm 40 has an inwardly extending crank pin 43 driven by a crank disk 44 on the end of a drive shaft 45, said crank disk and drive shaft being journalled in carrier block 30, as clearly shown in Fig. 5. Shaft 45 is driven at constant speed in any suitable manner. Mounted to oscillate in a bushing 48 in cylinder 15 is a pivot member comprising a sleeve 49 having on its end a slotted head 50 through which claw arm 40 slides.

When shaft 45 is rotated, the crank and slide-pivot guide of arm 40 cause the claw pin of the arm to advance into engagement with the film, then to move the film downwardly in its curved path through the pull down distance, and finally to withdraw from the film and to move upwardly to the first position for the next engagement of the film, all as will be understood without further detailed description. I have now described in some detail a preferred form of claw pin movement mechanism, claimed in my copending application entitled "Film movement," filed December 15, 1931. Ser. No. 581,155; but it will be understood this is merely for illustrative purposes and imposes no limitation on the registration means, and also that in the broadest aspect, and for the purpose of the broadest claims, the perforation engaging pin may be considered simply as a registering pin irrespective of any additional function it may have in certain specific cases in advancing the film.

On the side of the film opposite cylinder 15 is a gate 54 of any approved form, that here shown having antifriction rollers 55 holding the film up to the claw arm.

I proceed now to a description of the film holding means which engages the film alternately with the claw arm and holds the film stationary between periods of engagement by the claw pin. Numeral 60 designates the flexible pressure plate, which is preferably a strip of spring steel just greater in width than aperture 11. The lower end of plate 60 is secured to cylinder 15 (see Fig. 5), and its upper end is connected to an oscillating crank which is operated in consonance with the claw arm to lower the upper end of the plate as the claw arm disengages the film and thereby cause the plate to move forwardly into engagement with the film, and to move upwardly as the claw arm engages the film so as to straighten the plates out and free the film for movement. For this purpose, the upper end of plate 60 is mounted on a crank pin 70 carried by a shaft 71 and offset with respect to the shaft axis, shaft 71 being journalled in a suitable bearing 72 in wall 12 and being encased within a cylindrical housing 74, all as clearly shown in Fig. 3a. The pressure plate is interconnected with the claw arm through an eccentric 75 on shaft 45, connected by a rod 76 to an offset crank pin 77 carried by the rear end of shaft 71.

In Fig. 4 the claw arm is midway in its pull-down stroke and the crank pin at the upper end of the plate 60 is at the upper limit of its movement, plate 60 then being relatively straightened out and clear of the film. As the claw arm moves downwardly from the position of Fig. 4 the upper end of plate 60 is lowered until just at, or slightly before, the time the claw arm disengages the film the pressure plate moves into engagement therewith; and by the time the claw arm is midway in its return movement (Fig. 1) the upper end of plate 60 is at the lower extreme of its movement and the plate is in full engagement with the film. Then just as, or slightly after, the claw arm again engages the film, the pressure plate is straightened out and disengages therewith to permit the film to move. Thus the pressure plate engages the film and holds it in the exact position in which it is left by the claw pin until the claw pin reengages the film, when the plate releases the film for movement.

From what has now been said it will be understood that the claw pin in engaging the perforations of the film and moving the film through the pull down distance controls the lateral position of the film with respect to the exposure aperture, the film swinging slightly between the two guide rollers to permit the registering action of the claw pin; and it will be apparent, therefore, that in consequence the relation between the exposed area at any point on the film and the corresponding perforation by which that area was registered by the claw pin will be constant under all conditions. I prefer to use in connection with my film guide means the film holding means described above, or means of similar type (without registering pins), since in such a case the film is held between the pull-down at the exact registered position determined exclusively by the claw pin; however, in its broader aspects the invention is not to be limited to my preferred film holding means, or necessarily to any film holding means in particular, since any manner of restraining the film against shifting between periods of pull-down, such, for instance, as the mere friction of the gate or film raceway, may serve for this purpose.

Figs. 7 and 8 show a variational guide roller arrangement wherein spring pressure is provided to urge the guide roller against the edge of the film. In the specific arrangement shown, which is typical of any such means, the roller spindle 80 works freely in a lateral slot 81 and is engaged by rods 82 which are spring urged by flat spring 83 to move the roller against the edge of the film. Such provision insures proper engagement of the film by the guide rollers under all conditions. It will be obvious, however, that in cases in which it is desired to use this spring actuated roller arrangement, it will be sufficient if only the roller at one edge of the film be so arranged, the other remaining on a fixed axis as illustrated in Fig. 6.

It will be understood the drawings and description are to be considered merely as illustrative of and not restrictive on the broader claims appended hereto, for various changes in design, structure and arrangement may be made without departing from the spirit and scope of said claims.

I claim:

1. In means for guiding a perforated film strip past an exposure aperture, the combination of a single pair of opposed marginal film guides located adjacent said aperture and adapted to engage opposite edges of a film strip at single points, and a full fitting perforation engaging pin at one edge of the film strip only and spaced from said guides longitudinally of the film strip, all in such manner that engagement of said pin with a film perforation swings the film strip between said guides to register it properly with the exposure aperture.

2. In means for guiding and moving a perforated film strip past an exposure aperture, the combination of a single pair of opposed marginal film guides located adjacent said aperture and adapted to engage opposite edges of a film strip at single points, and film moving means comprising a full fitting perforation engaging claw pin at one edge of the film strip only and spaced from said guides longitudinally of the film strip, all in such manner that engagement of said pin with a film perforation swings the film strip between said guides to register it properly with the exposure aperture.

3. In means for guiding a perforated film strip past an exposure aperture, the combination of a single pair of opposed marginal film guides located on one side of said exposure aperture and adapted to engage opposite edges of a film strip at single points, and a full fitting perforation engaging pin at one edge of the film strip only and located on the other side of said exposure aperture, all in such manner that engagement of said pin with a film perforation swings the film strip between said guides to register it properly with the exposure aperture.

4. In means for guiding and moving a perforated film strip past an exposure aperture, the combination of a single pair of opposed marginal film guides located on one side of said exposure aperture and adapted to engage opposite edges of a film strip at single points, and film moving means comprising a full fitting perforation engaging claw pin at one edge of the film strip only and located on the other side of said exposure aperture, all in such manner that engagement of said pin with a film perforation swings the film strip between said guides to register it properly with the exposure aperture.

5. In means for guiding a perforated film strip past an exposure aperture, the combination of a single pair of opposed marginal film guides located ahead of said exposure aperture and adapted to engage opposite edges of a film strip at single points, and a full fitting perforation engaging pin at one edge of the film strip only and located beyond said exposure aperture, all in such manner that engagement of said pin with a film perforation swings the film strip between said guides to register it properly with the exposure aperture.

6. In means for guiding and moving a perforated film strip past an exposure aperture, the combination of a single pair of opposed marginal film guides located ahead of said exposure aperture and adapted to engage opposite edges of a film strip at single points, and a film moving means comprising a full fitting perforation engaging claw pin at one edge of the film strip only and located beyond said exposure aperture, all in such manner that engagement of said pin with a film perforation swings the film strip between said guides to register it properly with the exposure aperture.

GORDON B. POLLOCK.